(12) United States Patent
Griffin (10) Patent No.: US 11,659,811 B2
(45) Date of Patent: May 30, 2023

(54) STALL CLEANING TRAILER SYSTEM AND METHOD OF USE

(71) Applicant: Sha Griffin, Weatherford, TX (US)

(72) Inventor: Sha Griffin, Weatherford, TX (US)

( * ) Notice: Subject to any disclaimer, the term of this patent is extended or adjusted under 35 U.S.C. 154(b) by 1195 days.

(21) Appl. No.: 16/194,319

(22) Filed: Nov. 17, 2018

(65) Prior Publication Data

US 2019/0150394 A1 May 23, 2019

Related U.S. Application Data

(60) Provisional application No. 62/587,962, filed on Nov. 17, 2017.

(51) Int. Cl.
| | |
|---|---|
| *A01K 1/01* | (2006.01) |
| *A01C 3/06* | (2006.01) |
| *B08B 5/04* | (2006.01) |
| *B60P 3/04* | (2006.01) |

(52) U.S. Cl.
CPC .................. *A01K 1/01* (2013.01); *A01C 3/06* (2013.01); *A01K 1/0128* (2013.01); *B08B 5/04* (2013.01); *B60P 3/04* (2013.01)

(58) Field of Classification Search
CPC .... A01K 1/01; A01C 3/06; B08B 5/04; B60P 3/04; A01D 43/077
USPC ........................................................ 15/300.1
See application file for complete search history.

(56) References Cited

U.S. PATENT DOCUMENTS

| | | | | |
|---|---|---|---|---|
| 3,367,092 A | * | 2/1968 | Gifford | A01D 34/49 56/16.6 |
| 3,588,179 A | * | 6/1971 | Gifford | A01D 43/077 406/122 |
| 3,903,565 A | * | 9/1975 | Hicks | E01H 1/0836 15/340.1 |
| 4,218,226 A | * | 8/1980 | Boozer | B01D 45/02 96/414 |
| 4,881,362 A | * | 11/1989 | Parker | A01D 43/077 56/16.6 |
| 5,010,620 A | * | 4/1991 | Young | A01C 3/04 15/348 |
| 5,685,134 A | * | 11/1997 | Thornburg | A01D 43/00 56/12.9 |
| 6,223,387 B1 | * | 5/2001 | Anderson | E01H 1/0827 406/40 |

FOREIGN PATENT DOCUMENTS

FR  2589034 A1 * 4/1987 ............... A01C 3/00

* cited by examiner

*Primary Examiner* — Mahmoud Gimie
(74) *Attorney, Agent, or Firm* — Schultz & Associates, P.C.

(57) ABSTRACT

A stall vacuum trailer system to secure to a vehicle, the system includes a trailer supported by a frame and having a cargo compartment to receive particles therein; a vacuum machine supported by the frame, the vacuum machine having a motor; a fan device to mulch a substrate into the particles; and a hose extending from the fan and to extend to a rear of the cargo compartment; the fan device creates a vacuum effect to pull the substrate through the hose and further through the fan device and into the cargo compartment; the substrate is mulched into particles while entering the cargo compartment.

10 Claims, 7 Drawing Sheets

STALL CLEANING TRAILER SYSTEM AND METHOD OF USE

BACKGROUND

1. Field of the Invention

The present invention relates generally to stall cleaning systems, and more specifically, to a stall cleaning trailer system for efficiently removing substrate from a stall for quick cleaning.

2. Description of Related Art

Stall cleaning systems are well known in the art and are effective means to remove manure and substrate, such as wood shavings, from a stall. For example, it is a common practice to use a scoop and a wheelbarrow, wherein a user scoops out substrate and manure into the wheelbarrow and then proceeds to either spread the contents of the wheelbarrow as fertilizer or dump the contents into a trailer for removal to another site.

One of the problems commonly associated with conventional stall cleaning systems is efficiency. For example, it is common for large barns to require constant cleaning, thereby forcing workers and owners to spend exorbitant amounts of time cleaning a plurality of stalls.

Accordingly, although great strides have been made in the area of stall cleaning systems, many shortcomings remain.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

While the system and method of use of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the present application as defined by the appended claims.

DETAILED DESCRIPTION OF THE PREFERRED EMBODIMENT

Illustrative embodiments of the system and method of use of the present application are provided below. It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The system and method of use in accordance with the present application overcomes one or more of the above-discussed problems commonly associated with conventional stall cleaning systems. Specifically, the present invention provides a means to efficiently clean a plurality of stalls. These and other unique features of the system and method of use are discussed below and illustrated in the accompanying drawings.

The system and method of use will be understood, both as to its structure and operation, from the accompanying drawings, taken in conjunction with the accompanying description. Several embodiments of the system are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless described otherwise.

The preferred embodiment herein described is not intended to be exhaustive or to limit the invention to the precise form disclosed. It is chosen and described to explain the principles of the invention and its application and practical use to enable others skilled in the art to follow its teachings.

Figure 1:
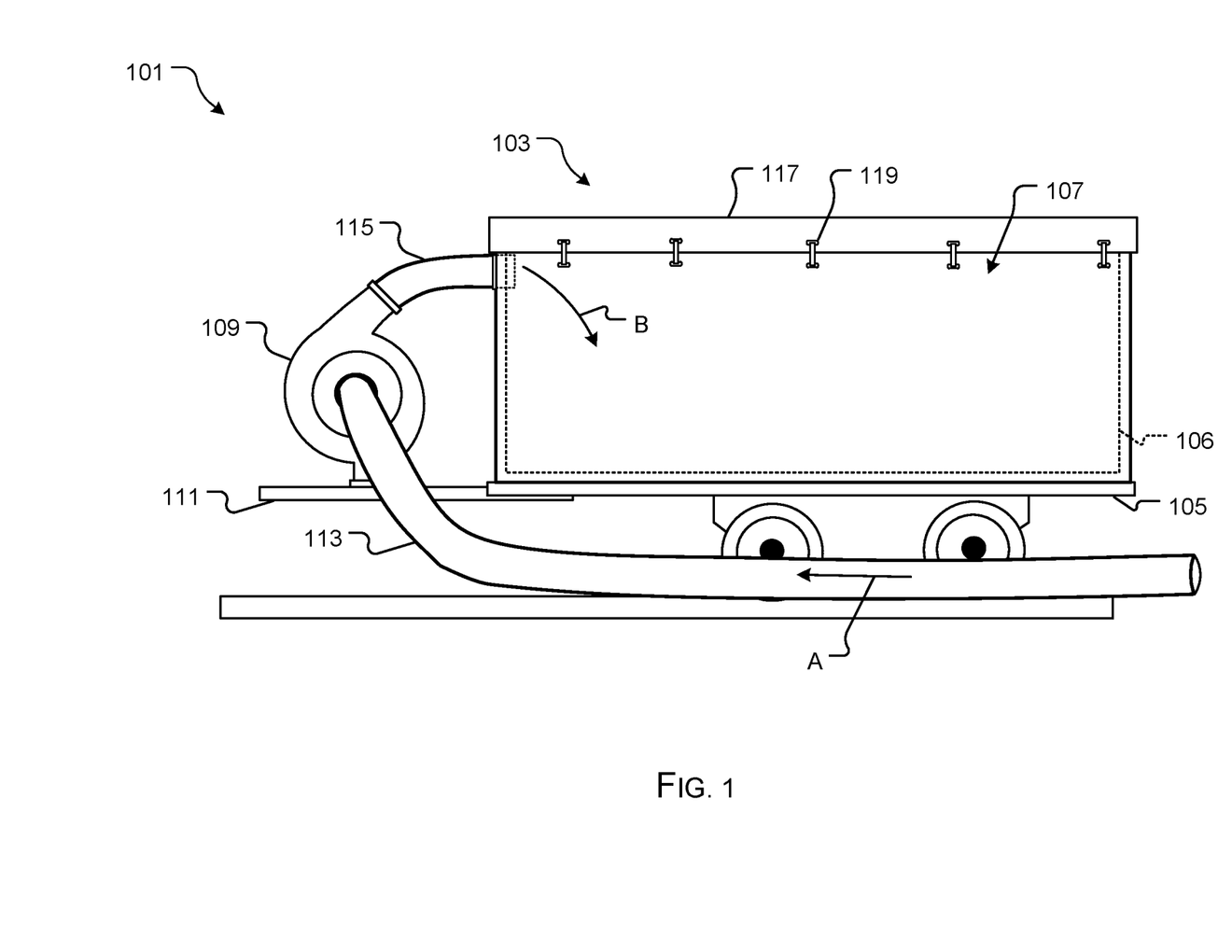
FIG. 1 is a side view of a stall cleaning trailer system in accordance with a preferred embodiment of the present application.

Referring now to the drawings wherein like reference characters identify corresponding or similar elements throughout the several views, FIG. 1 depicts a side view of a stall cleaning trailer system in accordance with a preferred embodiment of the present application. It will be appreciated that system 101 overcomes one or more of the above-listed problems commonly associated with conventional stall cleaning systems.

In the contemplated embodiment, system 101 includes a trailer 103 supported by a frame 105, the trailer having a cargo compartment 106 forming an interior area 107 configured to receive a substrate from a stall. It should be appreciated that the size of trailer 103 can vary, including a size appropriate to be towed and maneuvered by a small tractor, or alternatively, a larger size configured to be maneuvered via a large truck.

It must be understood that although the system of the present invention is described herein with reference to stall cleaning, the present invention is adapted for additional uses, such as in landscaping, construction, or other industries. Nothing contained herein should be construed as limiting the present invention to one use.

System 101 further includes a vacuum machine 109 mounted on a support 111, the machine 109 having a hose 113 extending to a rear of the trailer. It should be understood that the length and materials of hose 113 can vary. Vacuum machine 109 includes an internal fan configured to create a vacuum effect to cause suction through hose 113, thereby forcing shavings through hose 113 as shown with arrow A. In addition, vacuum machine 109 can include a mulcher (not shown in FIG. 1) configured to mulch the substrate removed from the stall into smaller particles, thereby saving room within interior 107. It is contemplated that machine 109 can either include one apparatus, such as the fan, which is configured to both create a vacuum and mulch the substrate, or alternatively, can include a plurality of apparatuses configured to create a vacuum and mulch. Upon the substrate entering machine 109 and being mulched, machine 109 then forces the particles through a secondary hose 115 and into interior area 107, as shown with arrow B.

In the preferred embodiment, system 101 further includes a roof 117 configured to secure to trailer 103 via one or more attachment devices 119. It is contemplated that roof 117 can be a tarp or other similar material, secured via ties or similar devices. In alternative embodiments, the roof could be a rigid, solid material integral with the trailer, such as steel or the like.

Figure 2:
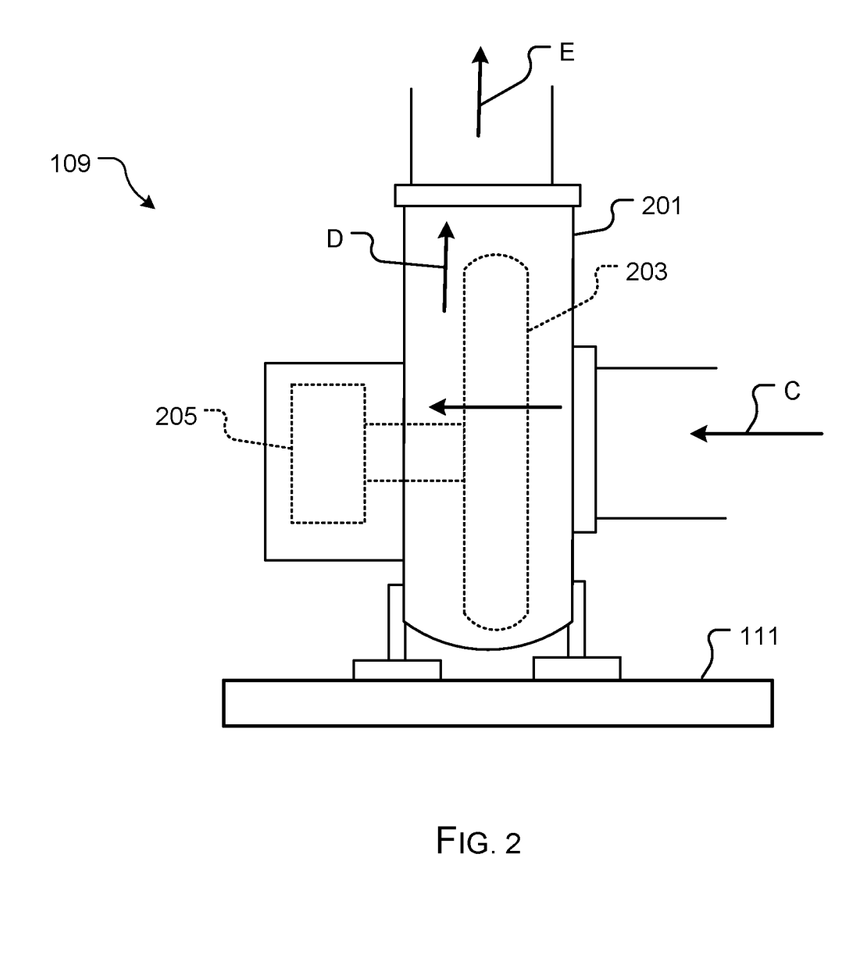
FIG. 2 is a simplified front view of a vacuum machine from FIG. 1.

In FIG. 2, a simplified front view of one embodiment of vacuum machine 109 is shown. Machine 109 includes at least one housing 201 configured to house a fan blade 203, the fan blade 203 being in communication with a motor 205. In this embodiment, fan blade 203 creates a vacuum, wherein substrate enters housing 201 and is pulled through blade 203. Blade 203 is further configured to mulch the substrate as it exits secondary hose 115 and enters the cargo compartment (as shown with arrows C, D, and E).

Figure 3:
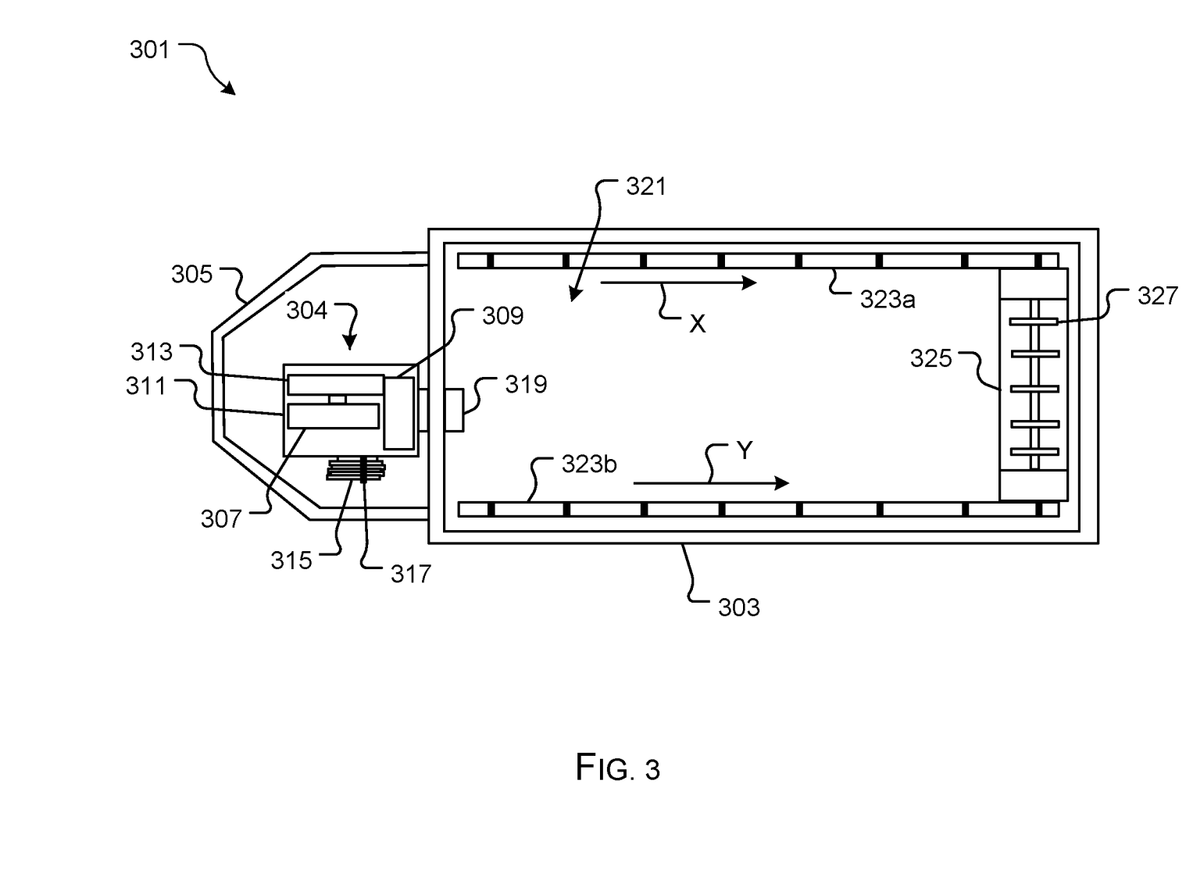
FIG. 3 is a top view of an alternative embodiment of a stall cleaning trailer system in accordance with the present invention.

In FIG. 3, a top view of a stall cleaning trailer system 301 in accordance with an alternative embodiment of the present application is shown. System 301 is similar in form and function to system 101 and includes a trailer 303 and a vacuum machine 304 attached to a support structure 305. In this embodiment, vacuum machine 304 includes a fan 307 and a mulcher 309 contained within a housing 311 as two separate units. Fan 307 and mulcher 309 include the necessary components to function, such as a motor 313.

System 301 further includes a hose 315 configured to fold into a compact position, as shown in FIG. 3, and secured in place via a securing device 317 such as a plurality of straps. A secondary hose 319 extends into an interior cavity 321 of trailer 303, thereby forming a passage for the particles to be blown into cavity 321.

As shown with system 301, it is contemplated that trailer 303 can house a spreading system, including one or more tracks 323a, 323b configured to move the particles toward an end of the trailer, as shown with arrows X and Y, wherein the particles come into contact with a spreader 325 having one or more blades 327 configured to spread the particles behind the trailer as the trailer is being pulled. It should be appreciated that this feature allows for system 301 to be used to clean one or more stalls and conveniently spread the particles behind the trailer.

Figure 4:
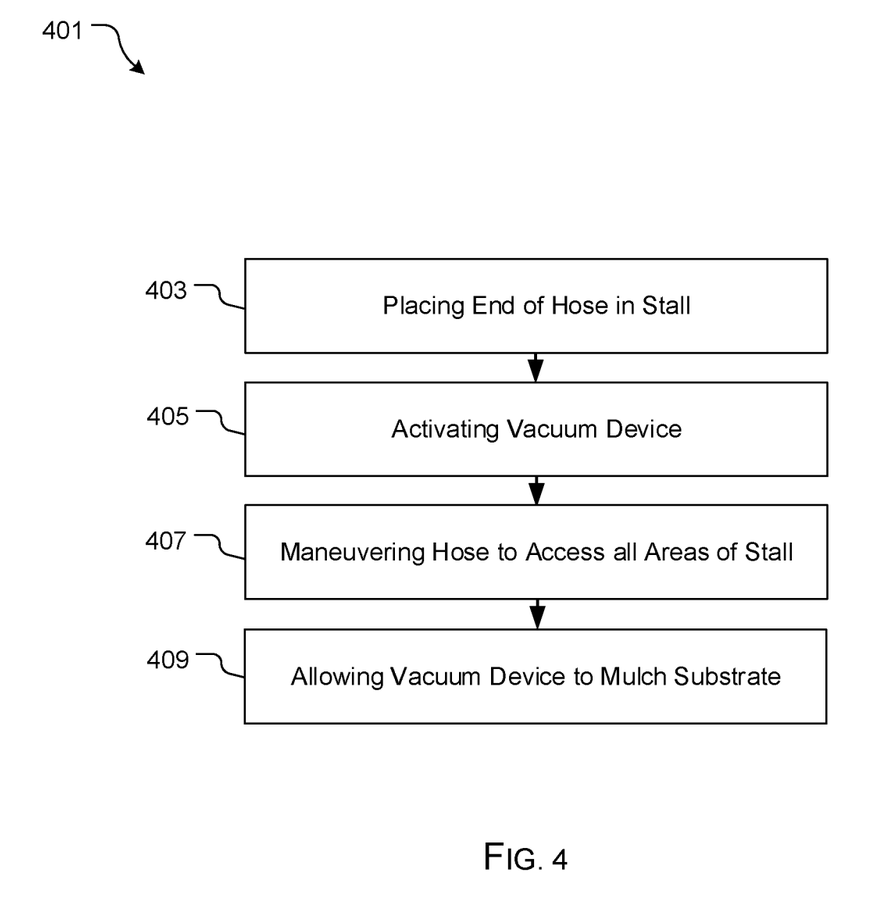
FIG. 4 is a flowchart of the method of use of the system of FIG. 1.

In FIG. 4, a flowchart depicts the method of use of systems 101 and 301. During use, the hose is extended into the stall and the vacuum device is activated, as shown with boxes 403, 405. The use maneuvers the end of the hose to come into contact with the desired areas of the stall, thereby allowing for the vacuum machine to remove and mulch the substrate before forcing the substrate into the trailer, as shown with boxes 407, 409.

It should be appreciated that one of the unique features believed characteristic of the present application is the attachment of a vacuum device to a trailer, thereby allowing for quick removal of stall contents via the hose.

It should be appreciated that the trailer system can have necessary components to allow the system to secure to a vehicle, such as a truck, tractor, or other vehicle.

Figure 5:
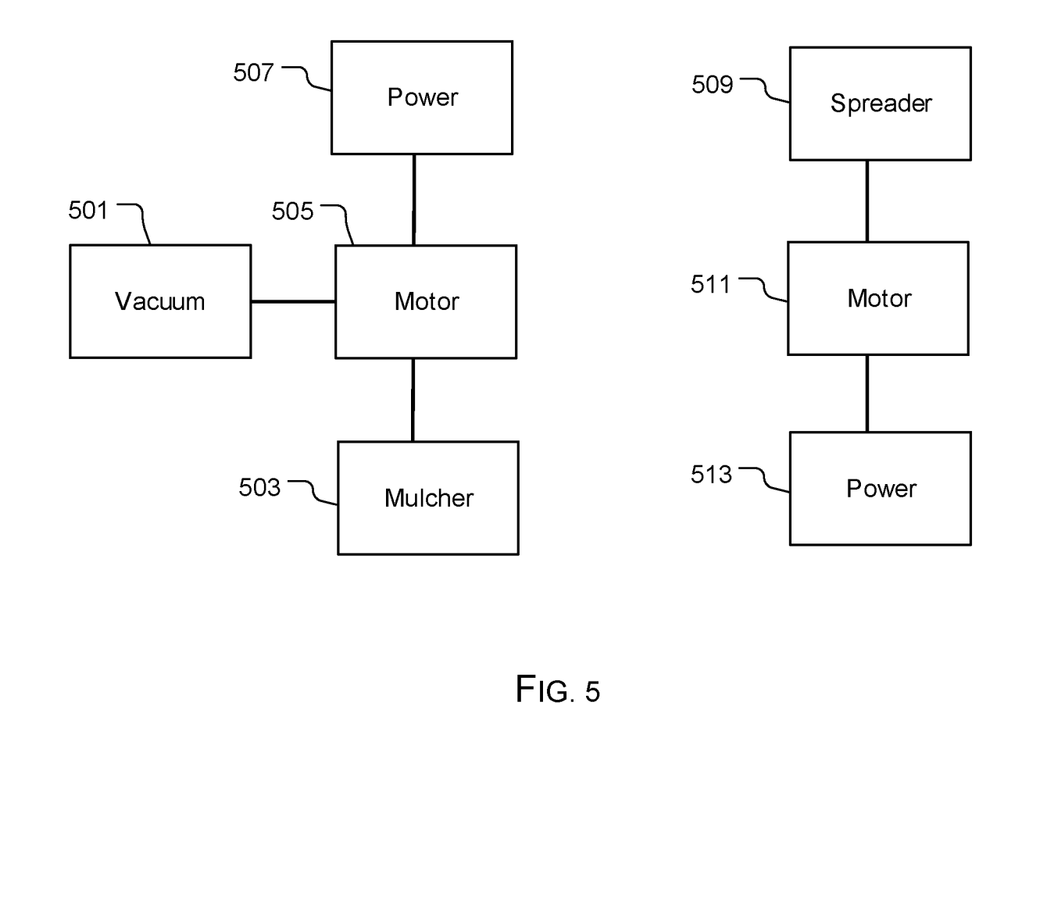
FIG. 5 is a simplified schematic of the control system components of the system of FIG. 3.

In FIG. 5, a simplified schematic depicts the needed components of a stall cleaning trailer system, having a vacuum 501 and mulcher 503 in communication with a motor 505 and a power source 507. It should be appreciated that motor 505 can run off of a fuel power source, or could be any other conventional motor. Further, the system can include a spreader 509 in communication with another motor 511 and power source 513.

Figure 6:
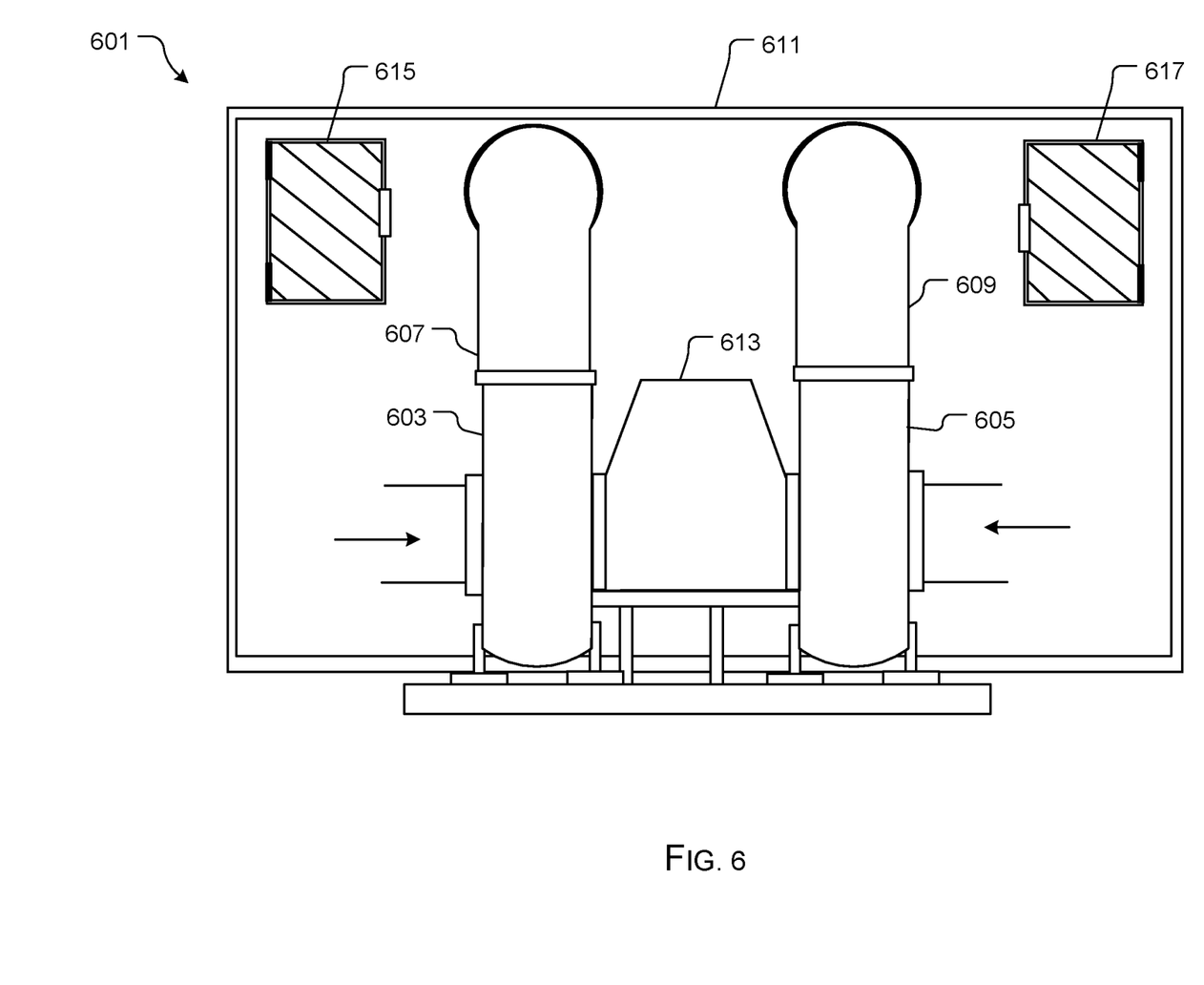
FIG. 6 is a simplified front view of an alternative embodiment of a stall cleaning trailer system in accordance with the present application.

In FIG. 6, an alternative embodiment of a stall cleaning trailer system 601 is shown. In this embodiment, two vacuum machines 603, 605 are included with two secondary hoses 607, 609 leading into the trailer 611. One or more motors 613 can be included to run the vacuums as needed. In addition, this system can include one or more venting doors 615, 617 configured to provide ventilation to the trailer, and also to provide a means for the user to open and examine how full the trailer is. It should be appreciated that the features of the various systems discussed herein are interchangeable.

Figure 7:
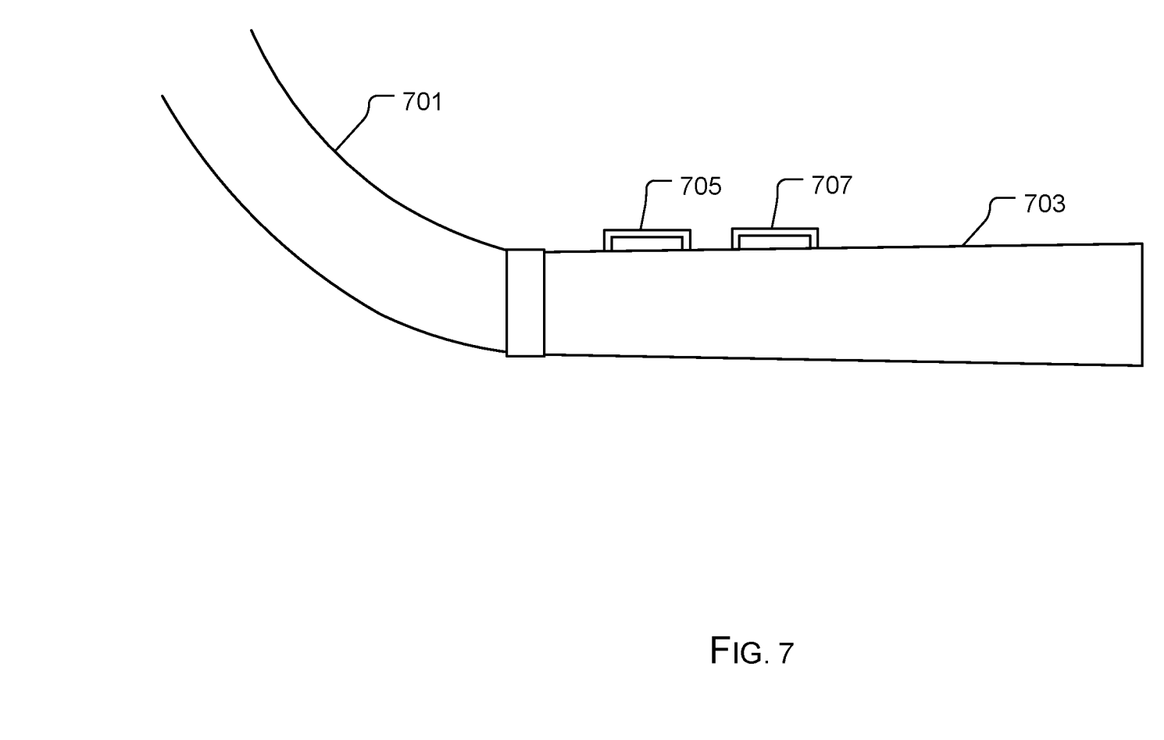
FIG. 7 is a side view of a hose attachment for use with a hose of the stall cleaning trailer system of the present invention.

In FIG. 7, a side view of a hose attachment is shown, wherein a hose 701 is attached to an attachment device 703 having one or more handles 705, 707. It should be appreciated that the attachment 703 can be composed of a metal or the like, thereby providing for easy manipulation within the a stall or the like.

The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed is:

1. A stall vacuum trailer system configured to secure to a vehicle, the stall vacuum trailer system comprising:
   a trailer, supported by a frame, and having a cargo compartment configured to receive particles therein;
   the cargo compartment further comprising a front and a rear;
   a vacuum machine, supported by the frame, the vacuum machine having a motor;
   a fan device, included in the vacuum machine, configured to mulch a substrate into the particles;
   a first hose, having a first end and a second end;
   the first end connected to the vacuum machine;
   the second end extending to the rear of the cargo compartment;
   a second hose, having a third end and a fourth end;
   the third end connected to the vacuum machine;
   the fourth end connected to the front of the cargo compartment; and wherein the fan device creates a vacuum effect to pull the substrate into the second end and through the first hose and further through the fan device;

wherein the fan device mulches the substrate into the particles and forces the particles through the second hose and further through the fourth end and into the cargo compartment.

2. The stall vacuum trailer system of claim 1, wherein the fan device comprises a fan and a mulcher.

3. The stall vacuum trailer system of claim 1, wherein the fan device further comprises a reversal configured to remove the particles from the cargo compartment.

4. The stall vacuum trailer system of claim 1, further comprising:
a spreader integrated into the frame and configured to receive the particles from the cargo compartment to spread the particles.

5. The stall vacuum trailer system of claim 1, wherein the first hose is extendable.

6. The stall vacuum trailer system of claim 1, further comprising:
one or more vented doors attached to the trailer.

7. The stall vacuum trailer system of claim 1, further comprising:
a second vacuum machine, supported by the frame, and having a third hose extending into the cargo compartment.

8. The stall vacuum trailer system of claim 1, further comprising:
a hose attachment configured to attach to the second end to facilitate substrate cleaning.

9. A method of cleaning a substrate from a stall, comprising:
providing a trailer, supported by a frame, and having a cargo compartment configured to receive particles therein;
providing the cargo compartment with a front and a rear;
providing a vacuum machine, supported by the frame, the vacuum machine having a motor;
providing a fan device, included in the vacuum machine, configured to mulch the substrate into the particles;
providing a first hose, having an open first end and an open second end;
providing the open first end connected to the vacuum machine;
providing the open second end extending to the rear of the cargo compartment;
providing a second hose, having an open third end and an open fourth end;
providing the open third end connected to the vacuum machine;
providing the open fourth end connected to the front of the cargo compartment;
maneuvering the open second end within the stall to come into contact the substrate; and
wherein the vacuum machine removes the substrate, through the first hose, and the fan device mulches the substrate; and,
wherein the vacuum machine forces the particles through the second hose into the cargo compartment.

10. A trailer comprising:
a frame and having a cargo compartment, having a front and a rear, configured to receive particles therein;
a vacuum supported by the frame;
a hose, having a first end and a second end;
the first end connected to the vacuum; and
the second end extending to the rear of the cargo compartment;
wherein the hose is in gaseous communication with the vacuum.

* * * * *